May 14, 1968     C. E. COUCHMAN III     3,382,992
MATERIAL TRANSPORTING AND DISCHARGING SYSTEM
Filed Aug. 17, 1966     2 Sheets-Sheet 1
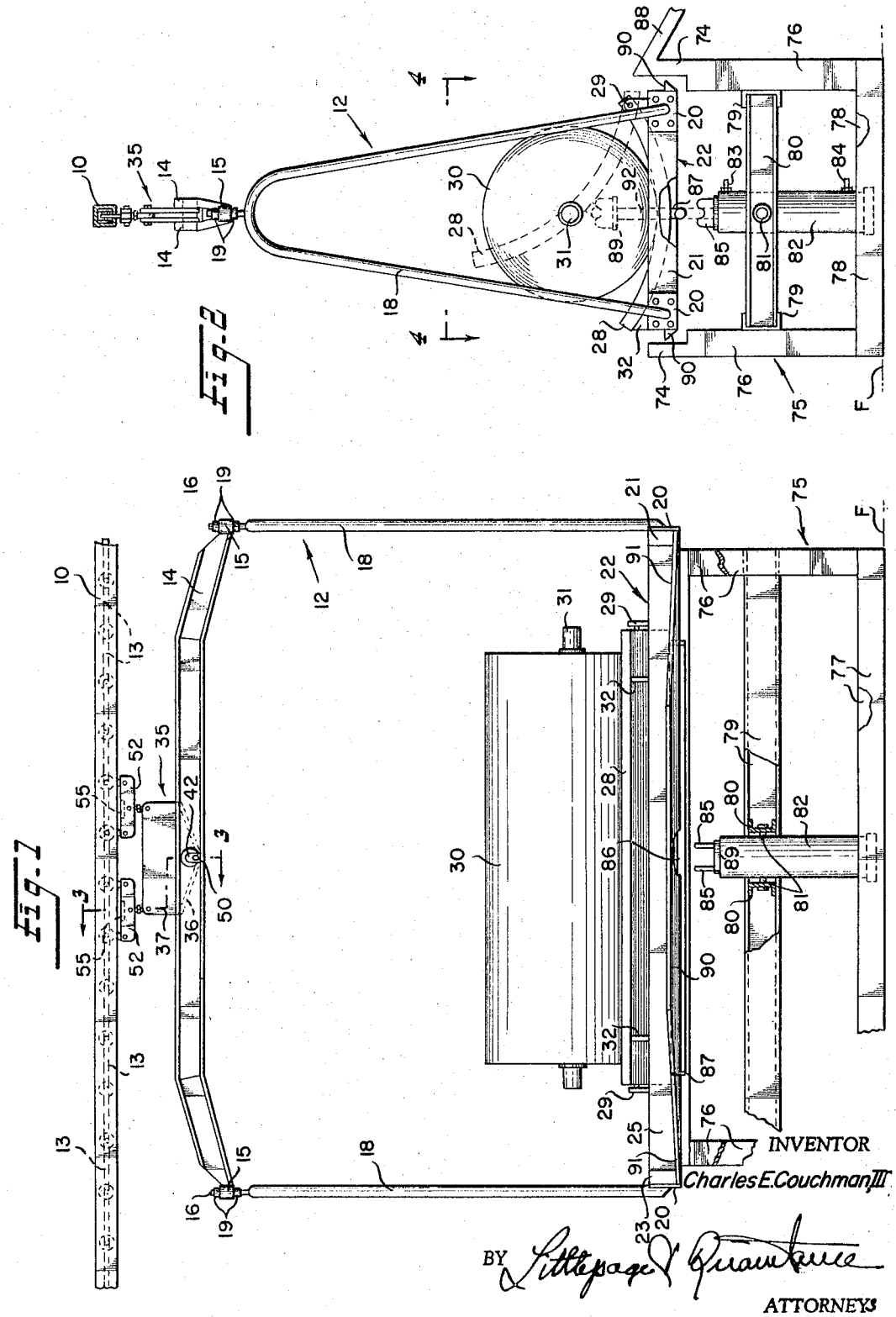
INVENTOR
Charles E. Couchman, III
BY *Littlepage & Quaintance*
ATTORNEYS May 14, 1968 C. E. COUCHMAN III 3,382,992
MATERIAL TRANSPORTING AND DISCHARGING SYSTEM
Filed Aug. 17, 1966 2 Sheets-Sheet 2
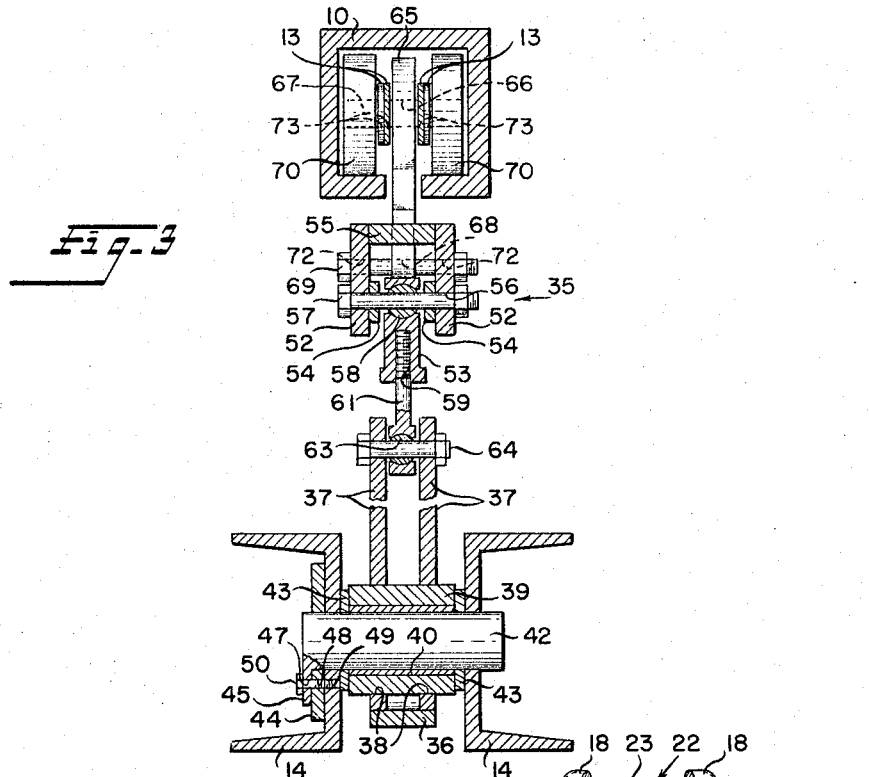
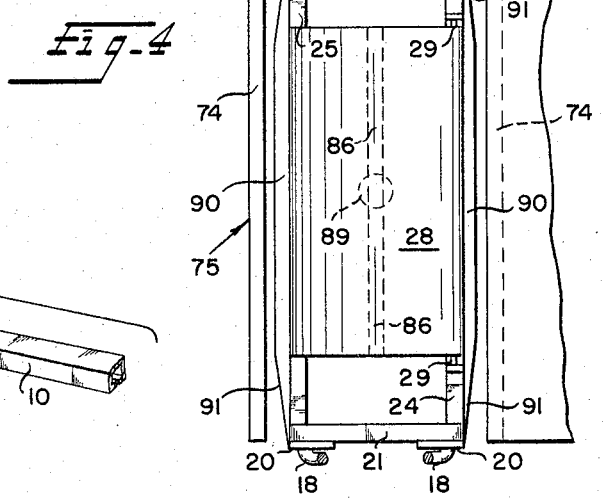
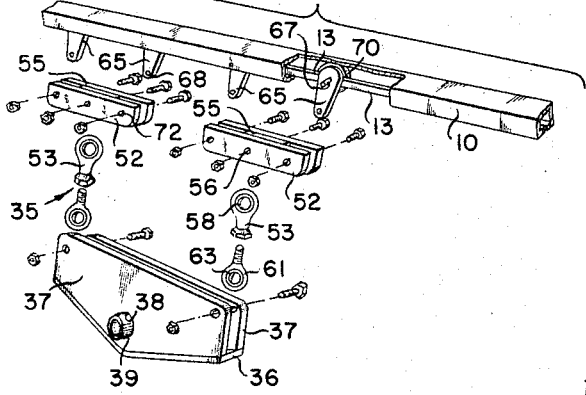
INVENTOR
Charles E. Couchman, III
ATTORNEYS

United States Patent Office 3,382,992
Patented May 14, 1968

3,382,992
MATERIAL TRANSPORTING AND
DISCHARGING SYSTEM
Charles E. Couchman III, Silver Spring, Md., assignor to
C & M Industrial Associates Inc., Washington, D.C.,
a corporation of Pennsylvania
Filed Aug. 17, 1966, Ser. No. 573,001
8 Claims. (Cl. 214—64)

This invention relates to a conveyor system, and is particularly concerned with an overhead track supporting a movable material carrier and with an unloading station for discharging material from the carrier.

One object of the invention is to provide an improved carrier and an unloading station cooperable therewith.

Another object of the invention is to provide an overhead conveyor carrier for transporting relatively heavy material, and particularly, rolls of textile material which may weigh, in some cases, up to 1500 pounds or more.

A further object of the invention is to provide an unloading station cooperable with a conveyor carrier, whereby material may be discharged by mechanical means from the carrier.

Other objects will be apparent from the remainder of the specification and the drawings.

In the drawings which form a part of this application—

FIGURE 1 is a side elevation of the conveyor track and carrier and the carrier unloading station, with certain portions shown broken away in order to illustrate details of construction;

FIGURE 2 is an end elevation of the structure shown in FIGURE 1, with certain portions shown broken away to reveal details of construction;

FIGURE 3 is an enlarged sectional view taken along the line 3—3 of FIGURE 1;

FIGURE 4 is a somewhat diagrammatic sectional view, taken on the line 4—4 in FIGURE 2, of the carrier in position for discharging at the unloading station; and FIGURE 5 is an exploded view, with certain parts broken away, showing the major components of a singletree-like assembly utilized to support the carrier from the track.

Referring now more particularly to the drawings, a conveyor track 10, in the form of an elongated open-bottom box section is supported by conventional means (not shown) in such manner as to be capable of supporting for movement therealong one or more carriers of the type designated generally as 12.

A conveyor chain 13, consisting of alternating double roller and link units, lies within the track 10 and is driven, when desired, by conventional chain-driving means (not shown) to move carriage 12 along the track. The track and chain will normally form a closed loop or circuit and may have portions at varying elevations, as will be understood by those skilled in the art.

The carrier 12 includes a pair of side-by-side supporting beams 14. Beams 14 are spaced at their central portions, for a reason which will be further described hereinafter, but are fastened together at their opposite ends by weldments, or the like, not shown.

At each of their joined ends, beams 14 have affixed thereto, by welding or the like, not shown, tubular vertically oriented sleeves 15. Sleeves 15 are for the purpose of receiving therein vertical threaded studs 16 which, at their lower ends, are each attached to identical inverted U-shaped hanger member 18, by weldments, or the like, not shown. In order to retain threaded studs 16 in sleeves 15, two nuts 19 are threaded to each stud, one above and one below each sleeve 15, as shown. These allow vertical adjustment and alignment of the carrier designated as 12.

Each of the lower ends of the hangers 18 is attached, by welding, or the like, not shown, to a mounting plate 20. The two plates 20 on one hanger 18 are bolted to a member 21, which forms one end of a rectangular frame, designated generally as 22. The plates 20 on the other hanger 18 are bolted to a member 23 which forms the other end of frame 22. End members 21 and 23 are held in rigid spaced relation relative to one another by frame side members 24, 25, the ends of which are attached, as by means of welding, or the like, not shown, to the ends of members 21 and 23.

A dished tray 28 is supported on frame 22 for pivotal movement by two hinges 29 which are affixed to the top of side member 24. The pivot axis of tray 28 is, thus, seen to be parallel to, but spaced a substantial distance from, the centerline of the carrier 12.

When an article, such as a roll of textile material, is being transported on carrier 12, the tray 28 is in the position shown in full lines in FIGURES 1 and 2, wherein one side of tray 28 is supported by the hinges 29 and the opposite side of tray 28 is resting on two rests 32, the lower ends of which are welded to side member 25.

Due to the dished shape of tray 28, the roll 30 continually tends to gravitate to the lowest lateral position it can assume relative to the tray. Thus, lateral or centrifugal forces tending to cause the roll to move off of the tray (for example, when the carrier 12 rounds a curve in the track 10) are counter-acted by the dished tray 28.

Movement of the roll 30 lengthwise of the carrier 12 is normally prevented during transport of the article and carrier along track 10, even though the track changes its orientation relative to a horizontal plane (i.e. slopes either upwardly or downwardly) because of the manner in which the carrier 12 is supported relative to the track 10, now to be described.

The carrier 12 is supported from the track 10 by a singletree-like assembly designated generally as 35. Assembly 35, more particularly, consists of a pair of horizontally spaced, identical doubletree plates 37, the lower central portions of each of which are located between the spaced central portions of beams 14 and have formed therein apertures 38. Apertures 38 have affixed therein, as by weldments or the like, not shown, a sleeve 39, concentric with a pressed-fit bushing 40. Bushing 40, in turn, is concentric with and journals a pivot pin 42. Elements 43 are spacing washers concentric with pivot pin 42, and 44 is another spacing washer. Sleeve 39 and welded-on spacer plate 36 maintain plates 37 in the spaced relationship desired.

Pivot pin 42, at the end adjacent washer 44 carries an integral depending ear 45 in which is formed an aperture 47. Spacing washer 44, and beam 14 adjacent thereto, have internally threaded apertures 48 and 49, respectively, formed therein in such manner that apertures 47, 48, and 49 may be aligned for the reception of a threaded locking bolt 50.

The purpose of locking bolt 50 is to retain pivot pin 42 in its proper position.

Doubletrees 37 are each supported at their opposite upper corners by spaced singletree units each of which are identical and comprise a pair of spaced singletree plates 52. Each facing pair of plates 52 is held spaced apart by a short spacer plate 55 welded between the top central portions of the plates 52.

In the central lower portion of each plate 52 is formed an aperture 56 through which passes a lock nut-fastened bolt 57. Surrounding and supported on the central portions of bolt 57 is an apertured ball-like element 58 around which is located, for limited universal movement a socket-including top hanger member 53. Elements 54 are washers which prevent ball-like element 58 from shifting laterally beyond a predetermined limited amount.

Hanger member 53 has formed in the lower portion thereof a vertically oriented, internally threaded bore 59.

Bore 59, it will be seen, receives the externally threaded portion of a socket-including bottom hanger member 61. Member 61 surrounds an apertured ball-like element 63 which is supported for limited lateral sliding movement on a lock nut-fastened bolt 64. Thus, members 61 can partake of limited universal movement around elements 63 in the same fashion as members 53 around elements 58.

The singletree units are each supported at their opposite ends by a pair of hanger plates 65. Plates 65 each have formed therein a top aperture 66 through which passes an axle 67, and a bottom aperture 68 through which passes a nut-fastened bolt 69.

Axles 67 are each supported by two rollers 70 which ride on the lower inturned flanges of track 10. Bolts 69 each pass through pairs of aligned apertures 72 formed near the ends of singletree plates 52 and, thus, support the singletree plates 52 from the hanger plates 65. The axles 67 of the singletree-like assembly 35 pass through apertures 73 in (and are thus connected to) the links of chain 13 for purposes of propulsion.

By means of the singletree-like assembly 35, the carrier 12 is rendered capable of maintaining a reasonably level condition during transit (presuming that the roll 30 is substantially centered thereon) even though the track 10 changes its inclination. However, should the roll 30, for some reason, shift lengthwise (for example, due to improper placement on the carrier 12 during loading), it can not completely fall off the carrier 12, so as to cause damage to adjacent persons or property, because the lowermost portion of the top of the tray 28 during transit is below the tops of members 21 and 23. Thus, members 21 and 23 would serve to stop and hold a lengthwise sliding roll until it could be righted.

The singletree-like assembly 35 serves another function in addition to allowing carrier 12 to remain level as it pivots about pivot pin 42. This other function is to allow the carrier 12 to negotiate curves in track 10 while still providing ample support for carrier 12. The ball and socket-like members previously described allow the necessary freedom of motion to achieve this function.

Referring now to FIGURES 1, 2 and 4, a discharge station is generally designated as 75. Station 75, more particularly, is comprised of four vertical corner legs 76, base-forming side elements 77 which are affixed between legs 76 (and which are adapted to be affixed to supporting floor F), and base-forming end elements 78 which are affixed between legs 76 (and which may also be affixed to supporting floor F, if desired). Station 75 further includes two spaced longitudinal guide rails 74, which parallel elements 77 and are affixed to the tops of legs 76, as by welding or the like, not shown, and two longitudinal support members 79, which also parallel elements 77 and have their opposite ends affixed to the central portions of legs 76.

Support members 79 are for the purpose of supporting two spaced transverse support members 80 which are affixed therebetween as shown. Members 80, in turn, journal oppositely directed pivot pins 81 which are attached to and extend radially from the body of a substantially conventional piston-including hydraulic actuating cylinder 82. Elements 83 and 84 are the usual fluid inlet/outlet lines normally associated with such cylinders.

The only features which distinguish cylinder 82 from the usual power cylinder of this type is, first, the fact that it is pivoted (at 81) above its center so that gravity causes it to hang vertically when not in use, and, second, the fact that the ram head 89 includes a pair of upstanding groove-including plates 85. Plates 85 are provided to cooperate with a bar 86 which is fixed relative to but spaced from the bottom of tray 28 by means of depending brackets 87. The purpose of bar 86 will be described hereinafter.

Attached to one guide rail 74 is a declining ramp 88 for a purpose to be described.

Attached to the outboard sides of side members 24 and 25 are identical but oppositely facing guide bars 90 which are provided with camming portions 91 to insure that the carrier 12 will enter the unloading station 75 without jamming. Bars 90 are bowed along their respective lengths to render them more rigid.

In order to describe how the unloading station 75 operates to discharge a roll 30 from a carrier 12, let it be assumed that a loaded carrier is being advanced toward the unloading station by chain 13. As the carrier 12 approaches the unloading station the camming portions 91 of the guide bars 90, as previously mentioned, assist the carrier 12 to enter between the guide rails 74 of the unloading station 75.

When the carrier 12 is advanced by chain 13 to the position relative to station 75 shown in FIGURE 4 the chain-driving means is stopped, either manually, by an operator or by automatic means, not shown. Carrier 12 is now in position relative to unloading station 75 for discharging of the load 30 from tray 28, and such discharging is accomplished as will now be described.

By conventional valving means, not shown, under the manual supervision of an operator, fluid under pressure from pump means, not shown, is caused to enter cylinder 82 through line 84 so as to bear the underside of a conventional piston, not shown, attached to the lower end of ram 92, and, thus, force ram 92 (and head 89 which is integral therewith) to rise. As is conventional, when the piston rises, any fluid thereabove is discharged through line 83 to the pump's reservoir.

Shortly after beginning its rise, head 89 contacts bar 86, and, due to the shape of the plates 85, bar 86 seats in the grooves therein. As the ram 92 continues to rise, tray 28 begins to pivot about the axis of the pivot pins of hinges 29. The ram 92 is allowed to continue its rise until tray 28 reaches the phantom-like position of FIGURE 2. Somewhere between the full and phantom line showings of tray 28 in FIGURE 2, roll 30 (due to gravity) will roll downwardly off of tray 28 and onto and down ramp 88 from whence it proceeds to a work table or additional conveying means, or the like, not shown.

Once roll 30 is discharged from tray 28 the fluid flow in cylinder 82 is reversed, in a manner well known to one skilled in the art, and ram 92 descends thereby causing tray 28 and ram 92 to resume their original (full line) positions (as seen in FIGURE 2).

The chain 13 may now be restarted in order to transport the non-empty carrier 12 away from station 75 for reloading.

During the raising of ram 92 and the pivoting of tray 28, the rest of carrier 12 will swing laterally slightly. The spacing between the guide rails 74 and guide bars 90 (see FIGURE 2) is designed to accommodate this lateral movement of the carrier 12.

Bar 86 is spaced from the lower face of tray 28, by means of brackets 87 to allow working room for the uppermost portions of plates 85 when bar 86 is nested in the grooves of plates 85. Were brackets 87 not provided, the aforesaid uppermost portions of plates 85 would engage and perhaps gouge into the lower face of tray 28. It is also possible, if bar 86 were not spaced below tray 28, for plates 85 to disengage from bar 86 during the ascent of ram 92 whereby roll 30 might be accidentally discharged from tray 28 in such fashion as to present a danger to adjacent persons or property.

It should now be clear from the foregoing description and from the drawings that the present invention provides a carrier (or carriers) for transporting a heavy load along overhead conveyor trackage and for discharging the load at an unloading station (or stations).

It will be appreciated that, in the system described, a certain amount of freedom is permitted in the positioning of the carrier relative to the unloading station during the unloading operation. It is only essential that some portion of the bar 86 is engageable with the grooves in plates 85. As can also be appreciated, the carrier 12 will be level for unloading (presuming that the load is correctly positioned thereon) even though track 10 is on an incline.

Those skilled in the art will realize that known automatic controls may be incorporated with the system just described, for example, to stop the chain driving means when a carrier 12 is in unloading position relative to the unloading station 75; to control the ascent and descent of ram 92 during carrier unloading; and to restart the chain driving means once the carrier 12 is unloaded and ram 92 has completely descended. However, such automatic controls are beyond the scope of the instant application which has been described as operatable under the manual supervision of an operator.

Having now set forth my invention, what I claim and desire to secure by Letters Patent is:

1. A material handling system of the character described including a load carrier suspended from and movable along an elevated track to and from an unloading station, said load carrier comprising a horizontal substantially rectangular open-centered frame including a pair of spaced side members joined to a pair of spaced end members; a downwardly bowed substantially rectangular tray having an upper side, an underside, opposite lateral sides and opposite ends with one of said sides of said tray overlying one of said side members and the other of said sides overlying and resting on supporting portions on the other side member when said tray is in load carrying position, means pivotally connecting said one side of said tray to said one side member whereby said other side of said tray can be swung upwardly to overlie said open center of said frame to cause a load resting on said tray to be discharged laterally therefrom under the influence of gravity, and means located on said underside of said tray between said opposite sides thereof, when said tray is in its load carrying position, adapted to cooperate with tray tilting means incorporated in said unloading station.

2. The system of claim 1 wherein at least a portion of the upper side of said tray is located within the open center of said frame and below the uppermost portions of said end members when said tray is in load carrying position, whereby said end members serve as stops in the event a load should shift lengthwise of said tray.

3. The system of claim 2 wherein said carrier is suspended from said track by means movably connecting said frame to said track, said connecting means including pivot means which allow said frame to continually seek a horizontal position under the influence of gravity when said carrier is either unloaded or properly loaded.

4. The system of claim 1, said tray tilting means including a fluid actuator pivoted to said unloading station and having a ram, said ram being adapted to move upwardly and downwardly through the open center of said frame to engage with said means located on the underside of said tray and, subsequent to said engagement, to pivot said tray relative to said frame when said carrier is correctly positioned relative to said unloading station.

5. The system of claim 4, wherein said means on the underside of said tray comprises a bar spaced from the tray and positioned parallel to said sides of said side frames and to the axis of said tray pivot means, and said ram includes a vertical plate having an upwardly opening groove in which said bar is receivable.

6. The combination of claim 4, said unloading station including a pair of guide rail means adapted to extend parallel to the outboard sides of said sides of said frame when said carrier is in position for unloading at said unloading station to limit lateral movement of said frame.

7. The combination of claim 6 including means on said sides of said frames for guiding said frame between said guide rail means.

8. The combination of claim 7, said unloading station including sloping ramp means attached to one of said guide rail means for receiving a load discharged from said tray.

References Cited

UNITED STATES PATENTS

| | | | |
|---|---|---|---|
| 514,662 | 2/1894 | Pine | 105—273 |
| 1,513,576 | 10/1924 | Benbow | 214—64 |
| 2,198,644 | 4/1940 | Wettengel | 214—1 |
| 2,597,914 | 5/1952 | Whitworth et al. | 105—148 |
| 3,307,495 | 3/1967 | Chapman et al. | 105—367 |

FOREIGN PATENTS

| | | |
|---|---|---|
| 614,895 | 12/1948 | Great Britain. |

C. B. LYON, *Assistant Examiner.*

ARTHUR L. LA POINT, *Primary Examiner.*